(12) United States Patent
Fukunaga et al.

(10) Patent No.: US 7,659,037 B2
(45) Date of Patent: Feb. 9, 2010

(54) NONAQUEOUS SECONDARY CELL

(75) Inventors: Hiroshi Fukunaga, Suita (JP); Youshin Yagi, Fukaya (JP); Shuichi Wada, Ibaragi (JP); Kenji Hara, Iga (JP); Kazushige Kohno, Hitachi (JP); Hiroshi Haruna, Hitachi (JP)

(73) Assignees: Hitachi, Ltd., Tokyo (JP); Hitachi Vehicle Energy, Ltd., Ibaraki (JP)

( * ) Notice: Subject to any disclaimer, the term of this patent is extended or adjusted under 35 U.S.C. 154(b) by 4 days.

(21) Appl. No.: 11/637,695

(22) Filed: Dec. 13, 2006

(65) Prior Publication Data

US 2007/0134558 A1 Jun. 14, 2007

(30) Foreign Application Priority Data

Dec. 14, 2005 (JP) ............................. 2005-359729

(51) Int. Cl.
*H01M 1/40* (2006.01)
(52) U.S. Cl. ....................... 429/329; 429/331
(58) Field of Classification Search ................ 429/329, 429/331, 332, 324, 231.95, 224, 326, 340, 429/231.4
See application file for complete search history.

(56) References Cited

U.S. PATENT DOCUMENTS

2005/0200795 A1* 9/2005 Kobayashi et al. .......... 349/141

2007/0015055 A1* 1/2007 Lee et al. ................. 429/231.1

FOREIGN PATENT DOCUMENTS

JP 2002-100358 4/2002
JP 2005-005117 1/2005

* cited by examiner

*Primary Examiner*—Patrick Ryan
*Assistant Examiner*—Monique Wills
(74) *Attorney, Agent, or Firm*—Antonelli, Terry, Stout & Kraus, LLP.

(57) ABSTRACT

Using a positive electrode active material including spinel type manganese oxide as the main constituent, a novel low cost and high output power flat type nonaqueous secondary cell for HEVs that has increased safety at overcharge, and superior storage properties and cycle life is provided. A flat type nonaqueous secondary cell that has increased safety and is superior in storage and cycle properties even though the cell is a laminate type cell which does not have a blocking mechanism can be obtained by blending the spinel type lithium manganese oxide of the positive electrode and 5 wt % to 40 wt % of layered type lithium manganese oxide, to suppress storage deterioration at a high temperature and to simultaneously achieve safety when overcharged, and further, by adding a Li compound having a structure as shown in Formula (1) structure, to suppress deterioration of a mixed positive electrode active material during a high temperature cycle.

7 Claims, 6 Drawing Sheets

NONAQUEOUS SECONDARY CELL

BACKGROUND OF THE INVENTION

1. Field of the Invention

The present invention relates to a flat type nonaqueous secondary cell for high output power applications, the secondary cell having a laminate type armour case applied for lithium ion secondary cells and lithium polymer secondary cells and the like.

2. Background Art

In recent years, hybrid electric vehicles (HEVs) that use a combination of a battery and gasoline have become popular due to environmental problems and others. This hybrid electric system requires a secondary cell that has large capacity and high output power. A nickel-hydrogen cell is mainly used for the power supply for HEVs because of its superiority in safety. Although a lithium ion cell is superior in energy density compared to a nickel-hydrogen cell, the former has a problem regarding safety due to its use of, for example, organic electrolytes. For this reason, various investigations regarding the safety of a lithium cell for HEVs, as well as for the purpose of obtaining high output power and prolongation of its life have continuously been carried out.

As a positive electrode active material for the lithium ion cell, oxides composed of a composite of lithium, cobalt, nickel, and manganese having layered type or spinel type structures are used. A layered type lithium cobalt oxide, which is superior in cell properties and is easy to synthesize, is currently used most often in small appliances such as cellular phones. However, because cobalt is low in its reserve and therefore expensive, layered type lithium nickel cobalt manganese oxide has been considered as its alternative.

On the other hand, high output power and increased safety are required for a large lithium ion cell for HEV. A spinel type lithium manganese oxide which is mainly used has increased safety, but it has poor durability compared to the layered type. Accordingly, a positive electrode active material, which is composed of a mixture of the spinel type structure oxide having increased safety and the layered type structure oxide having high output power and strong durability, is investigated in JP Patent Publication (Kokai) No. 2002-100358. This mixture of the spinel type and layered type lithium manganese oxides employed in this report, however, had a problem in terms of durability of over ten years as required by applications such as for HEVs.

Moreover, investigations not only on electrode materials but on electrolytes have been carried out as well to aim at strong durability. JP Patent Publication (Kokai) No. 2005-5117 investigates addition of a light metal salt to an electrolyte to prevent a decomposition reaction of the electrolyte at the negative electrode and deterioration due to a reaction of precipitated metal lithium and the electrolyte.

The subject of the present invention is to provide a laminate type nonaqueous secondary cell for a hybrid electric vehicle (HEV) with a superior cycle life using a positive electrode active material having as the main component a mixed material of spinel type and layered type lithium manganese oxides.

SUMMARY OF THE INVENTION

In the present invention, the positive electrode active material is a mixture of spinel type and layered type lithium manganese oxides, the negative electrode active material is a carbon material that can occlude and release lithium, and the nonaqueous electrolyte comprising a lithium salt is composed of a carbonate solvent mixture of, for example, ethylene carbonate or ethyl methyl carbonate, wherein the lithium compound is added to the solvent mixture.

The present invention is capable of suppressing deterioration of the positive electrode active material mixture in a high temperature cycle, as well as assembling a laminate type nonaqueous secondary cell superior in cycle properties and suitable for application in HEVs.

BRIEF DESCRIPTION OF THE DRAWINGS

FIG. 6 shows the secondary cell system.
Each numeral in FIGS. 1-6 means the following.
1$a$—positive electrode lead
1$b$—negative electrode lead
1$c$—modified polyethylene film
1$d$—polyimide tape area
1$e$—ultrasonic welding area
1$f$—thermal adhering area
1$g$—electrode group
2$a$—positive electrode sheet
2$b$—separator
2$c$—negative electrode sheet
2$d$—laminate sheet
3$a$, 4$a$—positive coating area
3$b$—power collecting part in positive electrode
4$b$—power collecting part in negative electrode
5$a$—two separators area
5$b$—heat-welded separators area

DETAILED DESCRIPTION OF THE PREFERRED EMBODIMENTS

EXAMPLE 1

Example 1 includes a nonaqueous secondary cell, which comprises an electrode group wherein a positive and negative electrode sheets are formed intermediated by a separator and a nonaqueous electrolyte, a laminate type armour case for accommodating the electrode group, and a positive and negative electrode leads connected respectively to the positive and negative electrode sheets; wherein a positive electrode active material used for the positive electrode that is formed on the positive electrode sheet comprises a spinel type and layered type lithium manganese oxides; and the nonaqueous electrolyte comprises a boron-containing lithium compound other than LiBF$_4$ such as 1,3-dioxolan borate-4,5-dione in a non-aqueous solution obtained by dissolving a lithium salt in a carbonate nonaqueous solvent.

The positive and negative electrodes are capable of occluding and releasing lithium, and constitute a nonaqueous secondary cell via an electrolyte.

Figure 1:
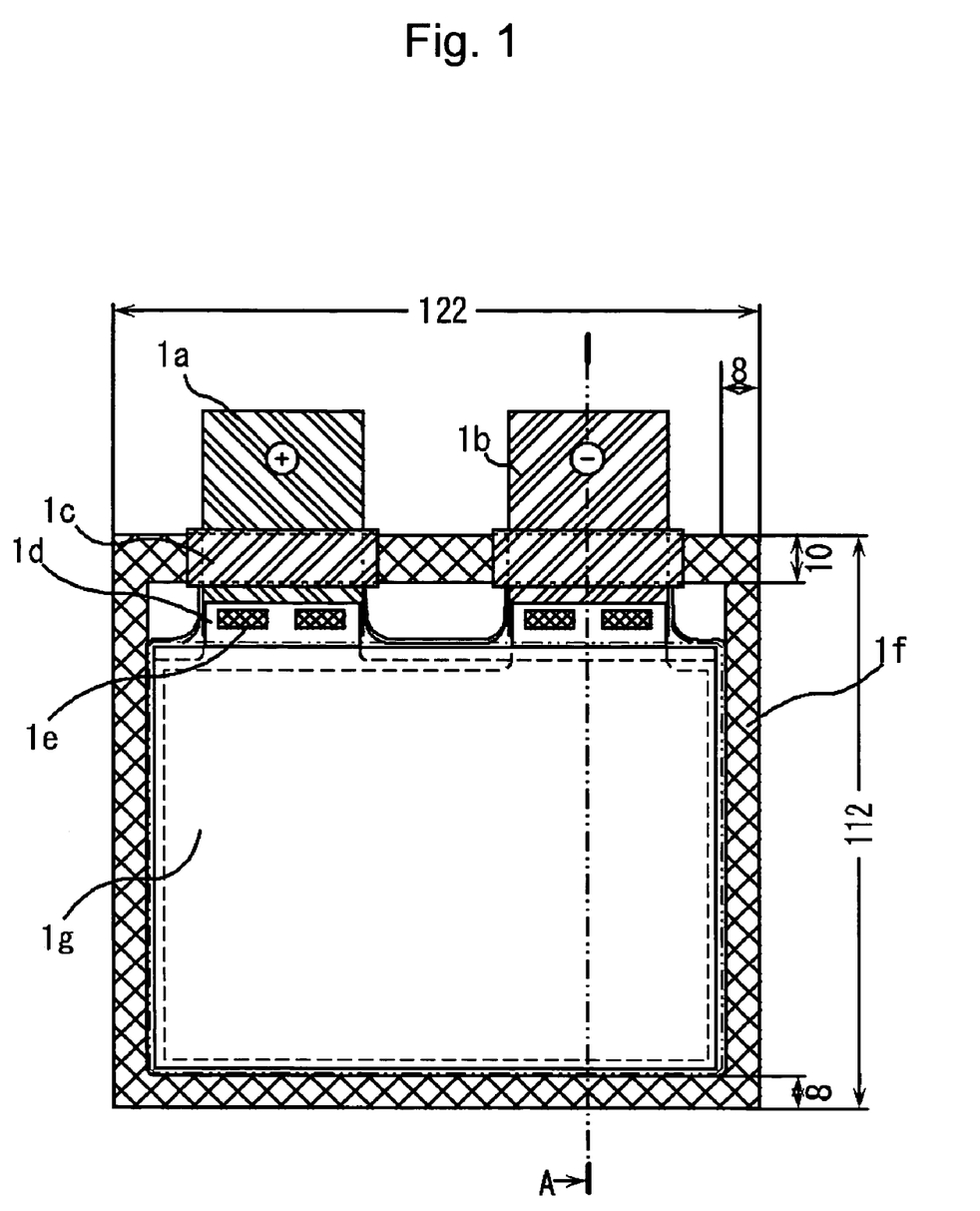
FIG. 1 is the plan view of the laminate type cell.
Figure 2:
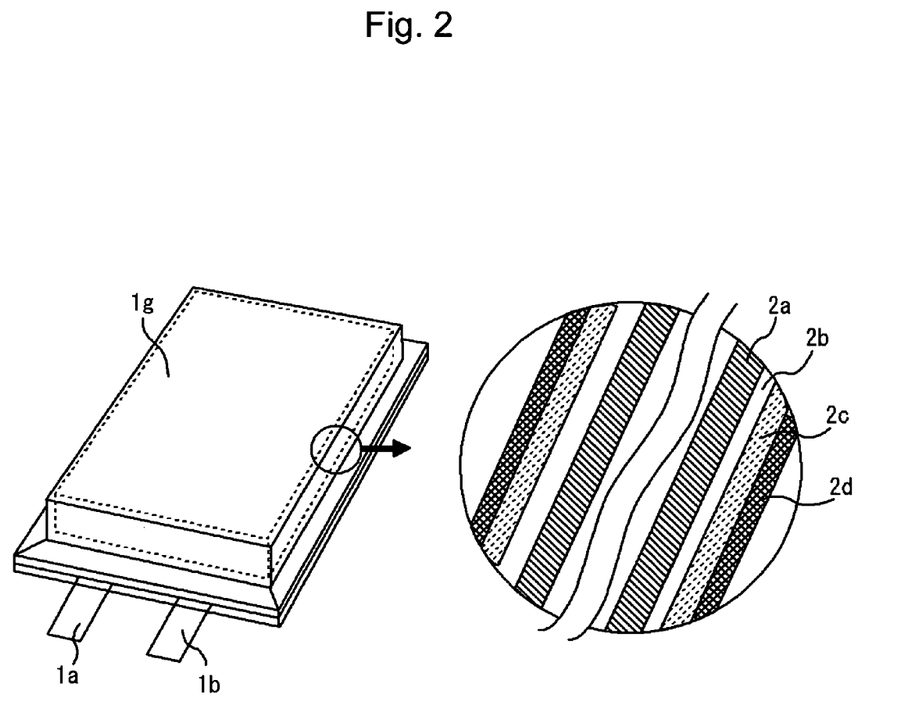
FIG. 2 is the cross-section view of the laminate type cell.

FIG. 1 shows the plan view of a laminate type nonaqueous secondary cell of the present invention, and FIG. 2 shows a cross-sectional view. The electrode group (1g) is the positive electrode sheet (FIG. 3) and the negative electrode sheet (FIG. 4) laminated intermediated by a separator, and the positive electrode lead (1a) and the negative electrode lead (1b) are welded and pass through the sealed area of a laminate type armour case that is composed of a laminate sheet and are pulled to the exterior. The laminate sheet is formed by laminating onto one side of an aluminum sheet with a thickness of 40 μm a polyethylene thermal adhesiveness resin layer at a thickness of 80 μm, injecting the electrolyte, and then sealing under vacuum. The pressure within the laminate type armour case is less than atmospheric pressure, preferably approximately 650 Torr or less, particularly preferably approximately 550 Torr or less. The sealing between the laminate sheets are carried out by pressing the sheets in close contact with each other on the thermal adhesiveness resin layer sides at their perimeter (1f) at 0.5 to 1 kg/cm$^2$, heating at 150 to 200° C. for 10 to 30 seconds, to allow to be joined by thermal adhesion between the thermal adhesiveness resins. The laminate type nonaqueous secondary cell is 112 mm×122 mm size, the thickness is 2 to 6 mm, the material of the positive electrode lead (1a) is aluminum with a thickness of 0.1 to 1 mm, and the material of the negative electrode lead (1b) is nickel with a thickness of 0.1 to 1 mm. When the capacity of the cell is set at 3 Ah, for example, a lead terminal with a width of 10 to 100 mm can be used.

The component and production condition of the laminate type nonaqueous secondary cell can be as with conventional cell materials, and are not limited to the materials and sizes described herein.

To obtain high output power, the thickness of the positive electrode sheet will be 90 to 120 μm, thinner than that for the high-capacity type such as for cellular phones. Taking the thickness of a base material into consideration, the thickness of the active material layer on one side is 35 to 50 μm. Accordingly, the average grain diameter of the positive electrode active material is preferably 10 μm, with a distribution of 1 to 30 μm. The average grain diameter is a grain diameter which is 50% of volume grain size distribution as measured by dry type laser diffraction. The specific surface areas of the positive electrode active materials are approximately 0.5 to 2 m$^2$/g or less, more preferably 0.7 to 1.5 m$^2$/g for both the spinel type and layered type lithium manganese oxides. The specific surface area was measured by absorption and desorption method using nitrogen gas.

The present invention will now be described in further detail with Experimental Examples.

EXPERIMENTAL EXAMPLE 1

Figure 3:
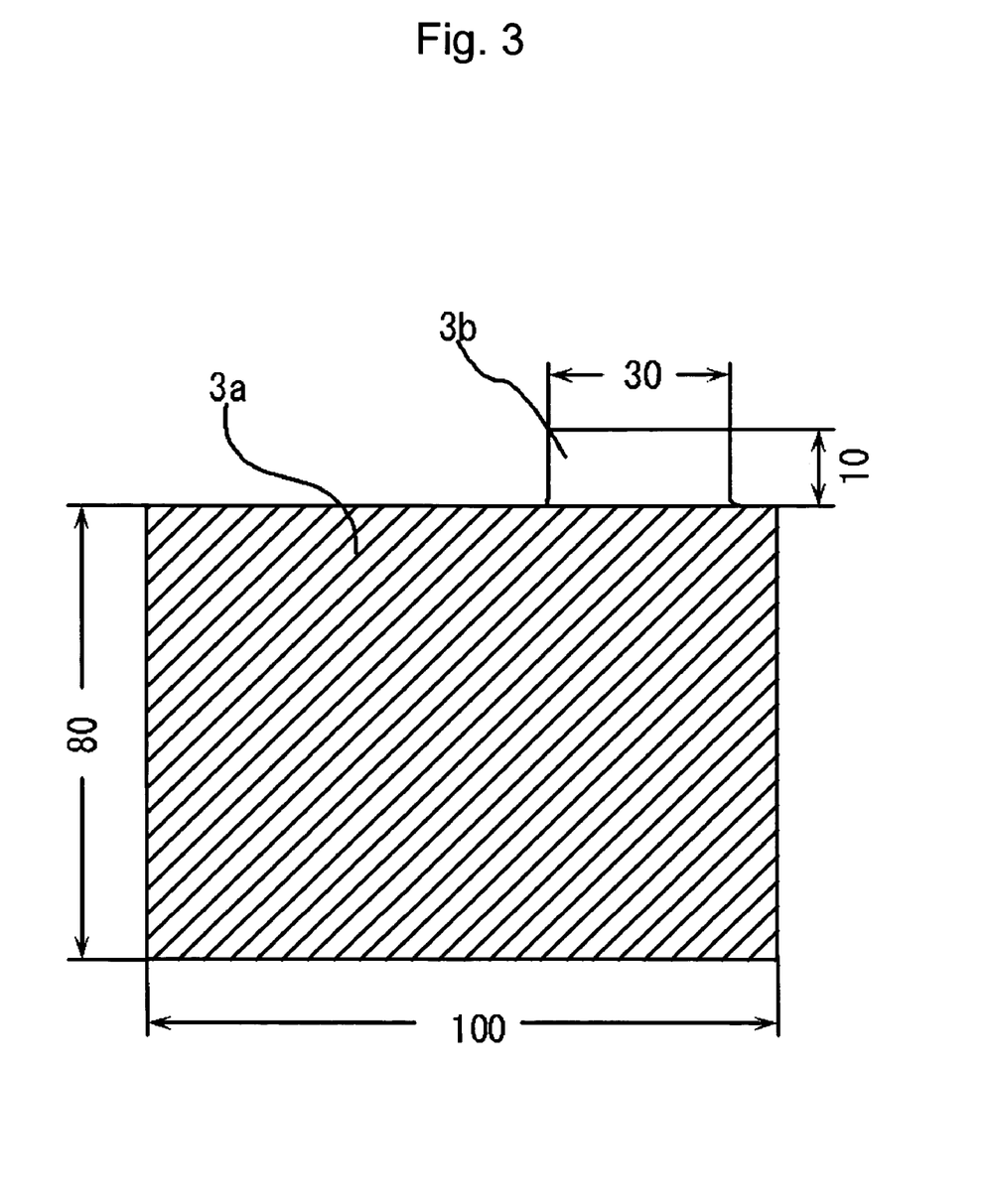
FIG. 3 shows the positive electrode sheet.

As shown in Table 1, $Li_{1.02}Mn_{1.98}Al_{0.02}O_4$ having an average grain diameter of 10 μm and a specific surface area of 1.5 m$^2$/g as the spinel type lithium manganese oxide, $Li_{1.02}Ni_{0.3}Co_{0.3}Mn_{0.3}Mg_{0.01}O_2$ having an average grain diameter of 8 μm and a specific surface area of 1.7 m$^2$/g as the layered type lithium manganese oxide, and acetylene black powder as conductive material, were subjected to dry blending. Polyvinylidene fluoride (PVDF) dissolved in N-methyl-2-pyrrolidone (NMP) was homogeneously dispersed in the mixture obtained to produce a paste. This paste was applied to both sides of an aluminum foil with a thickness of 20 μm, dried, and then pressed to a thickness of 120 μm to produce the positive electrode sheet. The solid content weight ratio within the positive electrode was spinel type lithium manganese oxide:layered type lithium manganese oxide:acetylene black:PVDF=80.8:4.2:10.8:4.3 (spinel type lithium manganese oxide:layered type lithium manganese oxide=95:5). FIG. 3 shows the positive electrode sheet. The applied area on the positive coating area (3a) was 80×100 mm$^2$. A power collecting part in the positive electrode (3b) where no paste is applied is provided on the long side of the electrode.

TABLE 1

|  | Spinel Type Lithium Manganese Oxide | Layered Type Lithium Manganese Oxide | Blend Ratio (Spinel Type/ Layered Type) | Amount of Boron-Containing Li Compound Added (wt %) |
|---|---|---|---|---|
| Experimental Example 1 | $Li_{1.02}Mn_{1.98}Al_{0.02}O_4$ | $Li_{1.02}Ni_{0.3}Co_{0.3}Mn_{0.3}Mg_{0.01}O_2$ | 95/5 | 1 |
| Experimental Example 2 | $Li_{1.04}Mn_{1.90}Al_{0.10}O_4$ | $Li_{1.02}Ni_{0.3}Co_{0.3}Mn_{0.4}O_2$ | 60/40 | 1 |
| Experimental Example 3 | $Li_{1.02}Mn_{1.98}Al_{0.02}O_4$ | $Li_{1.02}Ni_{0.3}Co_{0.3}Mn_{0.3}Mg_{0.01}O_2$ | 70/30 | 0.1 |
| Experimental Example 4 | $Li_{1.02}Mn_{1.98}Al_{0.02}O_4$ | $Li_{1.02}Ni_{0.3}Co_{0.3}Mn_{0.3}Mg_{0.01}O_2$ | 70/30 | 10 |
| Experimental Example 5 | $Li_{1.02}Mn_{1.90}Al_{0.10}O_4$ | $Li_{1.02}Ni_{0.4}Co_{0.4}Mn_{0.2}O_2$ | 70/30 | 1 |
| Experimental Example 6 | $Li_{1.02}Mn_{1.98}Al_{0.02}O_4$ | $Li_{1.02}Ni_{0.3}Co_{0.3}Mn_{0.3}Mg_{0.01}O_2$ | 50/50 | 1 |
| Experimental Example 7 | $Li_{1.02}Mn_{1.98}Al_{0.02}O_4$ | $Li_{1.02}Ni_{0.3}Co_{0.3}Mn_{0.3}Mg_{0.01}O_2$ | 97/3 | 1 |
| Experimental Example 8 | $Li_{1.02}Mn_{1.98}Al_{0.02}O_4$ | $Li_{1.02}Ni_{0.3}Co_{0.3}Mn_{0.3}Mg_{0.01}O_2$ | 70/30 | 15 |
| Comparative Example 1 | $Li_{1.02}Mn_{1.98}Al_{0.02}O_4$ | $Li_{1.02}Ni_{0.3}Co_{0.3}Mn_{0.3}Mg_{0.01}O_2$ | 70/30 | 0 |

Figure 4:
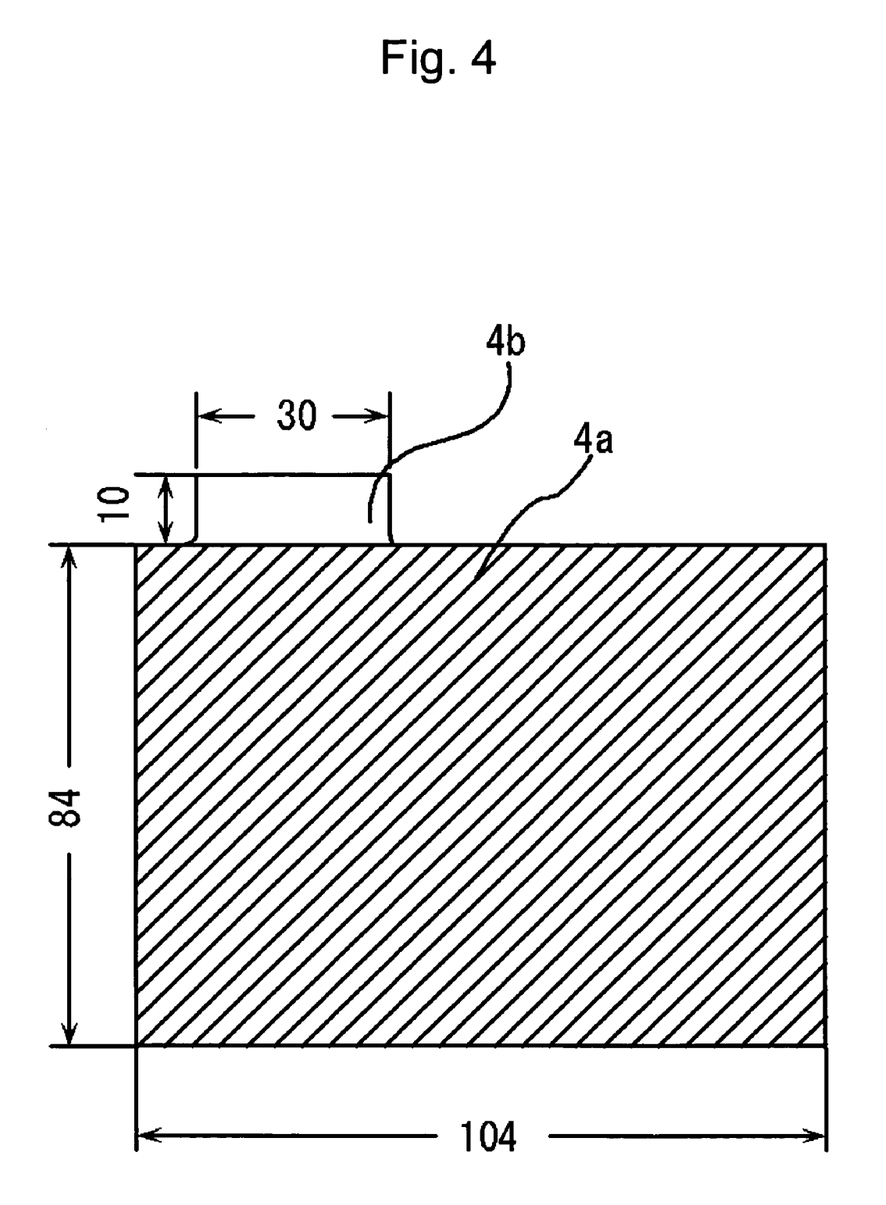
FIG. 4 shows the negative electrode sheet.

For the negative electrode active material, average amorphous carbon and acetylene black powder as conductive material were subjected to dry blending. Polyvinylidene fluoride (PVDF) dissolved in N-methyl-2-pyrrolidone (NMP) was homogeneously dispersed in the mixture obtained to produce a paste. This paste was applied to both sides of a copper foil with a thickness of 15 μm, dried, and then pressed to a thickness of 90 μm to produce the negative electrode sheet. The solid content weight ratio within the negative electrode was amorphous carbon:acetylene black:PVDF=87.6: 4.8:7.6. FIG. 4 shows the negative electrode sheet. The applied area on the negative coating area (4a) was 84×104 mm². A negative collecting electrode part (4b) where no paste is applied is provided on the long side of the electrode.

Figure 5:
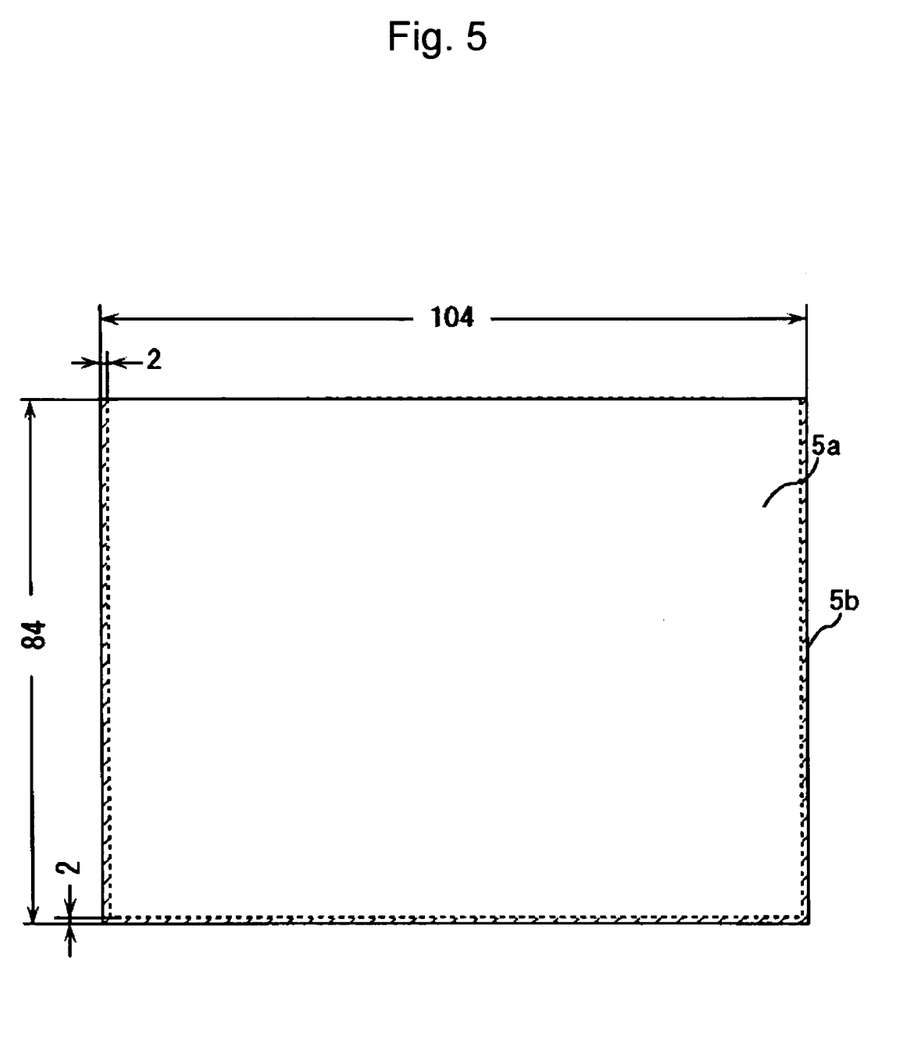
FIG. 5 shows the separator.

Two separators were layered (5a), and their three sides were heat-welded (5b). The positive electrode sheet produced was accommodated in the pouched separator with a thickness of 30 μm as shown in FIG. 5. The separator was microporous and formed from a polypropylene-polyethylene-polypropylene three-layer. Because it is a material having maximum suppression of shrinkage by heat, it is suitable for a cell used in a high temperature application, for example HEV.

20 negative electrode sheets and 19 positive electrode sheets accommodated in pouched separators were alternately laminated so that the negative electrodes are positioned on both exteriors to produce the electrode group (1g). To the collecting electrode parts which are the uncoated areas on the positive and negative electrode sheets, an aluminum positive electrode lead (1a) with a thickness of 0.3 mm, 30 mm×40 mm size and a nickel negative electrode lead (1b) with a thickness of 0.3 mm, 30 mm×40 mm size, respectively, coated with modified polyethylene film (1c), were joined by ultrasonic welding (1e). The burr at the welded area was protected with polyimide tape (1d). A hole of 3 mm φ is provided on the positive and negative electrode lead areas protruding from the welded area of the laminate type armour case.

The electrode group having lead terminal was accommodated in a laminate type armour case with a thickness of the armour area at 80 μm, 112 mm×122 mm, and with a trench of 86 mm×106 mm and a depth of 4.6 mm. The three sides of the laminate type armour case were joined by heat-welding at 150° C. for 10 seconds while pressing at 1 kg/cm². An electrolyte was injected from the unwelded side (FIG. 1, left side). As the electrolyte, $LiPF_6$ was dissolved in a solvent mixture of ethylene carbonate (EC), ethyl methyl carbonate (EMC), and dimethyl carbonate (DMC) at 1:1:1 to a concentration of 1 mol/l, and then 1 wt % of a lithium compound having a structure as shown in Formula (1) relative to the solvent mixture was added.

After injection, the unwelded area of the laminate type nonaqueous secondary cell was joined under reduced pressure at 550 Torr by heat-welding at 150° C. for 10 seconds while pressing at 1 kg/cm². The laminate type nonaqueous secondary cell is hereinafter referred to as a laminate type cell. The thickness of the cell was 4.8 mm.

The cell was left standing at room temperature for 24 hours, charged to 4.1 V with a constant current of 200 mA, and then a constant current and constant voltage charge which applies a constant voltage of 4.1 V was carried out for a total of 15 hours, after which the cell was discharged with a constant current of 200 mA to 2.7 V (standard charge and discharge). This charge and discharge was carried out for three cycles. The discharge capacity of the cell at the third cycle was 2 Ah.

[Chemical Formula 1]

(1)

X = F, CF₃

EXPERIMENTAL EXAMPLE 2

A laminate type cell was produced exactly as in Experimental Example 1, except that $Li_{1.04}Mn_{1.90}Al_{0.10}O_4$ having an average grain diameter of 10 μm and a specific surface area of 1.5 m²/g was used as the spinel type lithium manganese oxide, $Li_{1.02}Ni_{0.3}Co_{0.3}Mn_{0.4}O_2$ having an average grain diameter of 8 μm and a specific surface area of 1.7 m²/g was used as the layered type lithium manganese oxide, the solid content weight ratio within the positive electrode was spinel type lithium manganese oxide:layered type lithium manganese oxide acetylene black:PVDF=51.0:34.0:10.8:4.3 (spinel type lithium manganese oxide layered type lithium manganese oxide=60:40), and 1 wt % of the boron lithium compound having a structure as shown in Formula (1) was added to the carbonate solvent mixture, after which charge and discharge was carried out. Boron lithium compound is hereinafter referred to as lithium compound.

EXPERIMENTAL EXAMPLE 3

A laminate type cell was produced exactly as in Experimental Example 1, except that the solid content weight ratio within the positive electrode was spinel type lithium manganese oxide:layered type lithium manganese oxide:acetylene black:PVDF=59.5:25.5:10.8:4.3 (spinel type lithium manganese oxide:layered type lithium manganese oxide=70:30), and 0.1 wt % of the lithium compound having a structure as shown in Formula (1) relative to the solvent mixture was added, after which charge and discharge was carried out.

EXPERIMENTAL EXAMPLE 4

A laminate type cell was produced exactly as in Experimental Example 1, except that the solid content weight ratio within the positive electrode was spinel type lithium manganese oxide:layered type lithium manganese oxide:acetylene black:PVDF=59.5:25.5:10.8: 4.3 (spinel type lithium manganese oxide:layered type lithium manganese oxide=70:30), and 10 wt % of the lithium compound having a structure as shown in Formula (1) relative to the solvent mixture was added, after which charge and discharge was carried out.

EXPERIMENTAL EXAMPLE 5

A laminate type cell was produced exactly as in Experimental Example 1, except that $Li_{1.02}Mn_{1.90}Co_{0.1}O_4$ having an average grain diameter of 10 μm and a specific surface area of 1.5 m²/g was used as the spinel type lithium manganese oxide, $Li_{1.02}Ni_{0.4}Co_{0.4}Mn_{0.2}O_2$ having an average grain diameter of 8 μm and a specific surface area of 1.7 m²/g was used as the layered type lithium manganese oxide, the solid content weight ratio within the positive electrode was spinel type lithium manganese oxide:layered type lithium manganese oxide acetylene black:PVDF=59.5:25.5:10.8:4.3 (spinel type lithium manganese oxide layered type lithium manganese oxide=70:30), and 1 wt % of the lithium compound having a structure as shown in Formula (1) relative to the solvent mixture was added, after which charge and discharge was carried out.

EXPERIMENTAL EXAMPLE 6

A laminate type cell was produced exactly as in Experimental Example 1, except that the ratio was spinel type lithium manganese oxide:layered type lithium manganese oxide=50:50, after which charge and discharge was carried out.

EXPERIMENTAL EXAMPLE 7

A laminate type cell was produced exactly as in Experimental Example 1, except that the ratio was spinel type lithium manganese oxide:layered type lithium manganese oxide=97:3, after which charge and discharge was carried out.

COMPARATIVE EXAMPLE 1

A laminate type cell was produced exactly as in Experimental Example 1, except that the ratio was spinel type lithium manganese oxide:layered type lithium manganese oxide=70:30, and the lithium compound having a structure as shown in Formula (1) was not added, after which charge and discharge was carried out.

EXPERIMENTAL EXAMPLE 8

A laminate type cell was produced exactly as in Experimental Example 1, except that the ratio was spinel type lithium manganese oxide:layered type lithium manganese oxide=70:30, and 15 wt % of the lithium compound having a structure as shown in Formula (1) was added, after which charge and discharge was carried out.

Using Experimental Examples 1 to 8 and Comparative Example 1 as a safety test for the laminate type cell, an overcharge was carried out at a constant current of 20 A for 18 minutes. The cell was considered Not Good if ignition was observed, and Good if only fuming was observed.

Measurement of the output was carried out as follows: from the fully charge state at 4.1 V, the cell was discharged for 10 seconds at each of the current values 2 A, 10 A, and 20 A in an atmosphere of 25° C.; against the current on the horizontal axis, the cell voltage change was plotted on the vertical axis every 5 seconds; the current value at the point where the line from collinear approximation of three points crosses the final voltage 2.7 V was read; and the product of this current value and 2.7 V was determined as the output of the cell.

For a life test, the cell was charged at a constant current of 200 mA to 3.65 V, and then a pulse cycle test was carried out in an atmosphere of 50° C. One cycle of pulse pattern was 10 seconds charge at 200 W, 8 seconds pause, 10 seconds discharge at 200 W, and 8 seconds pause. After every 1000 cycles, the cell was discharged at a constant current of 200 mA to 2.7 V, and then charged at a constant current of 200 mA to 3.65 V (voltage adjustment). After 900,000 cycles, the output was measured, and an output retention ratio of before and after the pulse cycle was calculated from the following equation.

$$\text{Output Retention Ratio (\%)} = \frac{\text{Output After Pulse Cycle}}{\text{Output Before Pulse Cycle}} \times 100 \quad \text{[Formula 1]}$$

The test results are listed in Table 2.

TABLE 2

|  | Safety Test | Initial Output (W) | Retention Ratio After Pulse Cycle (%) |
|---|---|---|---|
| Experimental Example 1 | Good | 490 | 55.0 |
| Experimental Example 2 | Good | 510 | 54.5 |
| Experimental Example 3 | Good | 505 | 53.0 |
| Experimental Example 4 | Good | 490 | 50.2 |
| Experimental Example 5 | Good | 492 | 53.2 |
| Experimental Example 6 | Not Good | 520 | 55.0 |
| Experimental Example 7 | Good | 489 | 43.0 |
| Experimental Example 8 | Good | 350 | 56.5 |
| Comparative Example 1 | Good | 495 | 40.0 |

In Examples 1 to 5 wherein the constitution was such that the layered type lithium manganese oxide was 5 to 40 wt % relative to the total of the spinel type and layered type lithium manganese oxide and the lithium compound having a structure as shown in Formula (1) was added at 0.1 to 10 wt %, cells did not ignite in any of the safety tests and showed Good results. Initial output was 490 W or more, the output retention ratio after pulse cycle was 50% or more and therefore good. In Experimental Example 6 wherein the layered type lithium manganese oxide was added at 50 wt %, however, although initial output and output retention ratio were good, cells ignited in the safety test. Moreover, in Experimental Example 7 wherein the layered type lithium manganese oxide was added at 3 wt %, although safety test showed a Good result and initial output was superior at 489 W, output retention ratio was less than 43.0%. It is therefore preferred to add the layered type lithium manganese oxide at from 5% or more and 40% or less. In the cell of Comparative Example 1 wherein the lithium compound having a structure as shown in Formula (1) was not added, although the safety test and the initial output showed good results, the output retention ratio was low at 40.0%. Further, in the cell of Experimental Example 4 wherein the lithium compound having a structure as shown in Formula (1) was added at 15%, although the safety test and the output retention ratio showed good results, the initial output was low at 350 W. Accordingly, it is preferred that the lithium compound having a structure as shown in Formula (1) is added at from 0.1 wt % or more and 10 wt % or less.

As the spinel type and layered type lithium manganese oxides comprised in the positive. electrode active materials, a mixture of one or more spinel type lithium manganese oxides selected from the following (1) to (3) and one or more layered type lithium manganese oxides selected from the following (4) to (6) is preferred.

(1) The spinel type lithium manganese oxide is of the following general formula:

$Li_{(1+a)}Mn_{2-x}M_xO_4$, wherein $-0.1<a<0.2$, $0<x<0.2$, and M is at least one or more of Al, Ni, Co, Mg, Ti, Cr, Fe, and Cu.

(2) The spinel type lithium manganese oxide is of the following general formula:

$Li_{(1+a)}Mn_{2-x}M_xO_4$, wherein $-0.1<a<0.2$, $0\leq x<0.2$, and M is at least one or more of Al, Ni, Co, Mg, Ti, Cr, Fe, and Cu.

(3) The spinel type lithium manganese oxide is of the following general formula:

$Li_{(1+a)}M_2O_4$, wherein $-0.1<a<0.2$, and M is at least one or more of Al, Ni, Co, Mg, Ti, Cr, Fe, and Cu.

(4) The layered type lithium manganese oxide is of the following general formula:

$Li_{(1+a)}Ni_xCo_yMn_zM_vO_2$, wherein $-0.1<a<0.2$, $0<x<0.9$, $0<y<0.9$, $0<z<0.9$, $0<v<0.2$, $0.9<(x+y+z+v)<1.1$, and M is at least one or more of Al, Mg, Ti, Cr, and Fe.

(5) The layered type lithium manganese oxide is of the following general formula:

$Li_{(1+a)}Ni_xCo_yMn_zM_vO_2$, wherein $-0.1<a<0.2$, $0<x<0.9$, $0<y<0.9$, $0<z<0.9$, $0\leq v<0.2$, $0.9<(x+y+z+v)<1.1$, and M is at least one or more of Al, Mg, Ti, Cr, and Fe.

(6) The layered type lithium manganese oxide is of the following general formula:

$Li_{(1+a)}Ni_xCo_yMn_zO_2$, wherein $-0.1<a<0.2$, $0<x<0.9$, $0<y<0.9$, $0<z<0.9$, $0.9<(x+y+z)<1.1$, and M is at least one or more of Al, Mg, Ti, Cr, and Fe.

The molar ratio a of Li, i.e. a, is $-0.1<a<0.2$. When a is less than $-0.1$, cycle property is not sufficiently improved. On the other hand, when a is too large, the capacity of the active material is largely reduced.

In spinel type lithium manganese oxides (1) to (3):

Examples of the substituent metal M include Al, Ni, Co, Mg, Ti, Cr, Fe, and Cu, more preferably Al or Mg. When the molar ratio of the substituent metal M, i.e. x, is 0.2 or more, the capacity of the active material is largely reduced.

In layered type lithium manganese oxides (4) to (6):

The molar ratios of Ni, Co, and Mn, i.e. x, y, and z, are 0 to 0.9, preferably in the range of 0.2 to 0.4. When x, y, and z is largely beyond this range, spinel type structure other than the layered type partly precipitates. When the molar ratio of the substituent metal M, i.e. v, is 0.2 or more, the capacity of the active material is largely reduced. Examples of M include Al, Mg, Ti, Cr, and Fe, among which Al or Mg is more preferred. The total sum of x, y, z and v is $0.9<(x+y+z+v)<1.1$. When the sum is 0.9 or less or 1.1 or more, crystal phase other than the layered type structure precipitates and results in for example reduction of capacity.

The method for blending the positive electrode active material including the spinel type and layered type lithium manganese oxides may be by a generally used planetary dry blending, more desirably a method of homogeneously disposing the layered type lithium manganese oxide on the surface of the spinel type lithium manganese oxide by mechanofusion or ball mill.

Further, it is preferred that the positive electrode active material comprises the spinel type lithium manganese oxide more than the layered type lithium manganese oxide, more preferably the layered type lithium manganese oxide is at a content of 5 to 40 wt %. The oxygen desorption starting temperature at a highly charged state of the spinel type lithium manganese oxide has increased safety compared to the layered type lithium manganese oxide. When the spinel type lithium manganese oxide is stored at a high temperature, however, it will become more soluble in the electrolyte and the capacity will significantly deteriorate after storage, due to partial disproportionation of trivalent manganese into tetravalent and divalent manganese. In addition, the crystal structure of the layered type lithium manganese oxide at a high temperature is more stable than the spinel type material. The present invention has found that by adding the layered type lithium manganese oxide to the spinel type material, storage property can be significantly improved while maintaining increased safety of the spinel type. Moreover, when the layered type lithium manganese oxide is 5 wt % or less, storage property is reduced, and when the amount is greater than 40 wt %, ignition occurs upon overcharge.

In addition, cycle life at a high temperature can be improved regardless of the negative electrode material by adding the lithium compound to the electrolyte. Storage property can be improved by adding the layered type lithium manganese oxide to the spinel type lithium manganese oxide, but elution of manganese during charge and discharge becomes significant at a high temperature. In the spinel type lithium manganese oxide, trivalent manganese becomes partially disproportionated into tetravalent and divalent manganese during storage at a high temperature, which dissolves into the electrolyte. When manganese ion concentration in the electrolyte increases, the disproportionation reaction with the manganese ion of the layered type lithium manganese oxide which should be stable by nature is facilitated, and elution of manganese comprised in both the spinel type and layered type lithium manganese oxides occurs. To solve this problem, focus was set on lithium compounds.

When a lithium compound is added to the electrolyte, a manganese ion eluted from the spinel type and layered type lithium manganese oxides and the lithium compound are bound together and a complex is formed. The complex composed of manganese and the lithium compound forms a coating. This coating which comprises boron and manganese preferably coats the positive electrode active material. As a result, further elution of manganese from the spinel type and layered type lithium manganese oxides can be suppressed. Cycle life at a high temperature can be improved while maintaining safeness of the spinel type lithium manganese oxide and also having good storage property of the layered type lithium manganese oxide.

The lithium compound may be those which bind to the manganese ion eluted from the spinel type and layered type lithium manganese oxides in the electrolyte or which bind to form a complex coated layer, further preferably a boron-containing compound. In addition, it is preferred that the lithium compound is added at 0.1 to 10 wt % relative to the solvent mixture, further preferably at 0.5 to 5 wt %. When the amount is 0.1 wt % or less, the whole compound is used for coating the negative electrode surface at the initial charge and suppression of cycle deterioration is difficult. When the amount is 10 wt % or more, there will be excess reaction at the surface of the positive electrode active material upon progression of deterioration, resistance component increases, and output of the cell decreases.

Preferred negative electrode active materials include, amorphous carbon and graphite as materials which are superior in reversibility, and on the surface of which metal lithium is unlikely to be precipitated by the charge and discharge cycle. Graphite includes various graphite materials such as natural graphite, artificial graphite, graphite in which impurities are reduced by acid treatment, meso carbon micro beads, and graphitized carbon fiber. Graphite is high in crystallinity, change in potential associated with occlusion/release of lithium is small, and capacity that can be utilized as a cell will increase. Amorphous carbon includes, various amorphous carbon materials having a turbostratic structure obtained by heat decomposition of hydrocarbon in gaseous phase and selective orientation. Compared to graphite, amorphous carbon has more lithium occlusion, and deterioration of the material associated with charge and discharge is less.

Regarding the positive electrode, a mixture of spinel type and layered type lithium manganese oxides which is the positive electrode active material is made into a paste with for example a conductive AUXS, thickener, and polymer binder; applied to a metal support such as a metal foil, expanded metal, foam, and pierced steel plank; dried at 60 to 120° C. for 2 to 4 hours; pressed at 1 to 10 ton/cm$^2$; formed to a thickness of 60 to 130 μm; punching to a size of 80×100 mm excluding the collecting terminal part; and the positive electrode sheet can be obtained (FIG. 3).

Regarding the negative electrode, as with the positive electrode but using amorphous carbon as the negative electrode active material, the negative electrode active material is made into a paste with for example a conductive AUXS, thickener, and polymer binder; applied to a metal support such as a metal foil, expanded metal, foam, and pierced steel plank; dried at 60 to 120° C. for 2 to 4 hours; pressed at 1 to 10 ton/cm 2; formed to a thickness of 60 to 130 μm; punching to a size of 84×104 mm excluding the collecting terminal part; and the negative electrode sheet can be obtained (FIG. 4).

Particular examples of a binder include polyvinylidene fluoride (PVDF), polytetrafluoroethylene, fluororubber, styrene butyl rubber, polyethylene, polypropylene, and acrylic resin, and although it is not particularly limited, a fluorine material is preferred. The amount of the binder contained is not particularly limited, and may be determined as necessary according to the type, grain diameter, shape of the positive or negative electrode active material of the present invention, properties of the electrode such as thickness and strength. The amount of the binder contained in the positive and negative electrodes is approximately 1 to 15 wt %, preferably 3 to 10 wt % relative to the total solid content of the paste.

Any conductive material well-known in the art can be used, examples of which include acetylene black, natural graphite, artificial graphite, and ketjen black.

Examples of an organic solvent for paste include N-methyl-2-pyrrolidone (NMP) and N,N-dimethylformamide (DMF), which can be used to adjust viscosity.

The sheeted positive (FIG. 3) and negative electrodes (FIG. 4) produced are laminated intermediated by a separator (FIG. 5). The separator is determined as necessary taking into consideration flame resistance and safety suitable for high output power application. Examples of materials for the separator include a microporous membrane of polyolefin materials such as polyethylene and polypropylene, and an integrated binding film wherein these materials are alternately layered. Examples include polyamide, kraft paper, glass, and bonded materials such as cellulose material. Taking into consideration output property and yield of for example short circuit, the thickness of these materials is 10 to 50 μm, preferably 15 to 30 μm.

The lithium salt used for the nonaqueous electrolyte is not particularly limited, and LiPF$_6$, LiClO$_4$, LiBF$_4$, LiAsF$_6$, LiSbF$_6$, and bis-pentafluoroethane imide lithium sulfonate for example can be used, preferably LiPF$_6$ or LiBF$_4$. The concentration of the lithium salt is not particularly limited, and approximately 0.5 to 2 mol/l of nonaqueous electrolyte is desirable. Examples of the nonaqueous solvent include ethylene carbonate (EC), ethyl methyl carbonate (EMC), diethyl carbonate (DEC), dimethyl carbonate (DMC), and propylene carbonate (PC). These are selected at an appropriate time according to operating range such as high or low temperature, and the blend ratio is determined as necessary. For EC:EMC: DMC, for example, a range of 10 to 50:10 to 50:10 to 50 is preferred.

Moreover, it is better that these nonaqueous electrolytes have low water content, preferably a water content of 100 ppm or less. A gel or solid electrolyte may be used instead of the nonaqueous electrolyte.

These nonaqueous electrolytes may comprise well-known additives as necessary such as a disulfide derivative, cyclohexyl benzene, and vinylene carbonate. The amount of these additives contained is not particularly limited, preferably 0.01 to 5 wt % relative to the total amount of the nonaqueous electrolyte.

As described above, in the laminate type cell, maintenance of increased safety and improvement of cycle property at a high temperature can be simultaneously achieved by having a constitution such that the layered type lithium manganese oxide was 5 to 40 wt % and the Li compound having a structure as shown in Formula (1) was added at 0.1 to 10 wt % relative to total of the spinel type and the layered type lithium manganese oxide, to obtain a laminate type cell with high output power suitable for HEV application.

EXAMPLE 2

As Example 2, a secondary cell system was assembled, wherein the cell system has multiple nonaqueous secondary cells formed from a pair of positive and negative electrodes via a nonaqueous electrolyte, multiple cell controllers that control each of said multiple nonaqueous secondary cells, and a battery controller that controls the multiple cell controllers and performs sending and receiving of signal between the cell and an automotive equipment.

Figure 6:
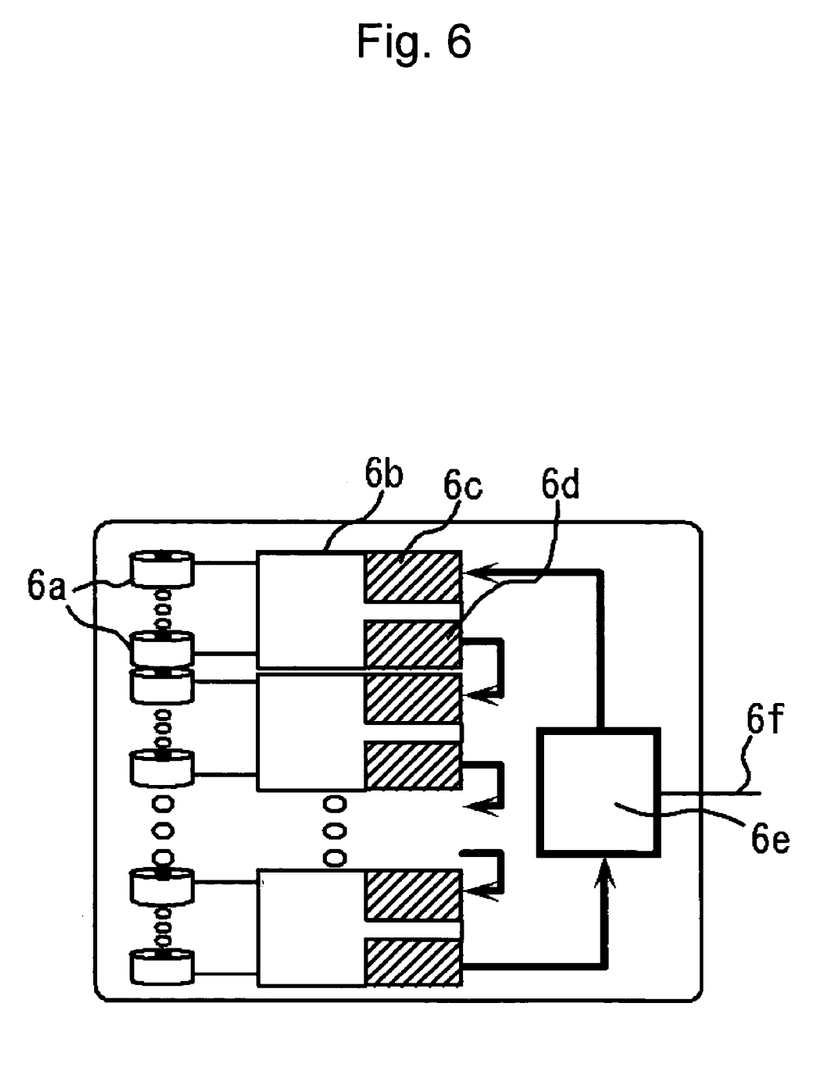

FIG. 6 shows a skeletal form of a secondary cell system carrying the laminate type cell produced in the present embodiment.

For example, multiple nonaqueous secondary cells 6a are serially connected to form a nonaqueous secondary cell group. Multiple nonaqueous secondary cell groups as above are further contained.

Cell controller 6b is formed corresponding to the nonaqueous secondary cell group as above, and controls the nonaqueous secondary cell 6a. The cell controller 6b monitors overcharge and overdischarge of the nonaqueous secondary cell 6a, as well as remaining capacity of the nonaqueous secondary cell 6a.

Battery controller 6e manages input/output of electrical power to/from the cell controller 6b, such as providing a signal to the cell controller 6b, as well as obtaining a signal from the cell controller 6b. For example, battery controller 6e continually transmits a signal from output part 6d of the first cell controller 6b to input part 6c of the another cell controller 6b. The signal is transmitted from output part 6d of the last cell controller 6b to the battery controller 6e.

Accordingly, the battery controller 6e can monitor the cell controller 6b.

The battery controller 6e is connected to the control system of a mobile appliance and vehicle via a signal line 6f, and can output control signal according to demand from the mobile appliance and vehicle.

What is claimed is:

1. A nonaqueous secondary cell having an electrode group in which positive and negative electrode sheets are arranged intermediated by a separator and a nonaqueous electrolyte, a laminate type armour case for accommodating said electrode group, and positive and negative electrode leads connected respectively to said positive and negative electrode sheets, wherein the positive electrode active material used for a positive electrode formed on said positive electrode sheet includes spinel type and layered type lithium manganese oxides, and said nonaqueous electrolyte is obtained by dissolving $LiPF_6$ in a carbonate nonaqueous solvent including at least one of ethylene carbonate, ethyl methyl carbonate, and dimethyl carbonate to form a nonaqueous solution, and further contains 1,3-dioxolan borate-4,5-dione having the formula (1):

X = F, CF₃

2. A nonaqueous secondary cell in which a positive electrode that can occlude and release lithium and a negative electrode that can occlude and release lithium are formed via an electrolyte, wherein said positive electrode includes spinel type and layered type lithium manganese oxides, said spinel type lithium manganese oxide is larger in amount than said layered type lithium manganese oxide, and said nonaqueous electrolyte is obtained by dissolving $LiPF_6$ in a carbonate nonaqueous solvent including at least one of ethylene carbonate, ethyl methyl carbonate, and dimethyl carbonate to form a nonaqueous solution, and further contains 1,3-dioxolan borate-4,5-dione having the formula (1);

X = F, CF₃

3. A nonaqueous secondary cell in which a positive electrode that can occlude and release lithium and a negative electrode that can occlude and release lithium are formed via an electrolyte, wherein said positive electrode includes spinel type and layered type lithium manganese oxides, said spinel type lithium manganese oxide is larger in amount than said layered type lithium manganese oxide, and said nonaqueous electrolyte contains a boron-containing lithium compound (other than $LiBF_4$) in a nonaqueous solvent obtained by dissolving $LiPF_6$ in a carbonate nonaqueous solvent including at least one of ethylene carbonate, ethyl methyl carbonate, and dimethyl carbonate.

4. A nonaqueous secondary cell in which a positive electrode that can occlude and release lithium and a negative electrode that can occlude and release lithium are formed via an electrolyte, wherein said positive electrode includes spinel type and layered type lithium manganese oxides, said spinel type lithium manganese oxide and/or said layered type lithium manganese oxide has a coating containing boron and manganese, and said electrolyte is obtained by dissolving $LiPF_6$ in a carbonate nonaqueous solvent including at least one of ethylene carbonate, ethyl methyl carbonate, and dimethyl carbonate.

5. The nonaqueous secondary cell according to claim 1, wherein at least one of a disulfide derivative, cyclohexyl benzene, and vinylene carbonate is added to said nonaqueous electrolyte.

6. The nonaqueous secondary cell according to claim 1, wherein the negative electrode active material used for the negative electrode formed on said negative electrode sheet includes at least one of amorphous carbon and graphite.

7. A secondary cell system having multiple nonaqueous secondary cells formed from a pair of positive and negative electrodes via a nonaqueous electrolyte, multiple cell controllers that control each of said multiple nonaqueous secondary cells, and a battery controller that controls the multiple cell controllers and performs sending and receiving of signal between the cell and an automotive equipment, wherein said positive electrode includes spinel type and layered type lithium manganese oxides, and said nonaqueous electrolyte is obtained by dissolving $LiPF_6$ in a carbonate nonaqueous solvent including at least one of ethylene carbonate, ethyl methyl carbonate, and dimethyl carbonate, and further contains a boron-containing lithium compound (other than $LiBF_4$).

* * * * *